Nov. 11, 1969  H. M. CONE, JR  3,478,310
AIRCRAFT COMMAND ALTITUDE GUIDANCE APPARATUS
Filed Sept. 14, 1966  5 Sheets-Sheet 1

INVENTOR.
HOWARD M. CONE, JR.
BY
his  ATTORNEYS

INVENTOR.
HOWARD M. CONE, JR.

his ATTORNEYS

INVENTOR.
HOWARD M. CONE, JR his ATTORNEYS

Nov. 11, 1969  H. M. CONE, JR  3,478,310
AIRCRAFT COMMAND ALTITUDE GUIDANCE APPARATUS
Filed Sept. 14, 1966  5 Sheets-Sheet 4

INVENTOR.
HOWARD M. CONE, JR.
BY
his ATTORNEYS

Nov. 11, 1969　　　　　　　H. M. CONE, JR　　　　　　　3,478,310
AIRCRAFT COMMAND ALTITUDE GUIDANCE APPARATUS
Filed Sept. 14, 1966　　　　　　　　　　　　　　5 Sheets-Sheet 5

INVENTOR.
HOWARD M. CONE, JR.

his ATTORNEYS

United States Patent Office 3,478,310
Patented Nov. 11, 1969

3,478,310
AIRCRAFT COMMAND ALTITUDE GUIDANCE APPARATUS
Howard M. Cone, Jr., Douglaston, N.Y., assignor to Pan American World Airways, Inc., New York, N.Y., a corporation of New York
Filed Sept. 14, 1966, Ser. No. 579,288
Int. Cl. G08g 5/00
U.S. Cl. 340—27                                   11 Claims This invention relates to aircraft guidance apparatus and, more particularly, to new and improved means for indicating to a pilot the necessary command altitude information to enable him to maintain his aircraft on a predetermined slant path between two locations at different altitudes.

Changes in altitude are inherent in the normal operation of conventional aircraft. For example, in any run between two points, an aircraft must climb from an airport at ground level to a cruising altitude of many thousands of feet. Upon arrival at its destination, it must descend to an airport and land accurately on a runway. In these days of high speed aircraft and crowded airways and airports, such changes in altitude are always fraught with potential hazard and must be executed with the greatest of accuracy if accidents are to be avoided.

A number of navigation aids have been devised for the purpose of providing a pilot with guidance in flight and particularly in effecting a safe landing at an airport. However, such equipment is complicated and expensive and usually is available only at the major world airports. Some of such equipment, like the visual light glide path aid designated VASI, is usable only when the visibility is adequate. Accordingly, it is frequently necessary for aircraft pilots to make descents and landings and execute other changes in altitude without the benefit of navigational aids of this type. As a result, the altitude and distance separations between aircraft set by the authorities in the interest of safety are considerably greater than they might otherwise be if more effective guidance information were available to the pilot.

It has also been proposed to provide a pilot with guidance information during a blind approach by controlling a glide slope indicating device on the aircraft in response to the output of aircraft distance measuring equipment in such manner that the desired glide slope altitude indicated by the device corresponds at any moment during a blind approach to the measurement made by the equipment of the distance of the aircraft from a preselected ground point. Nothing has ever come of this proposal, however, because of many inherent limitations, viz., its use is restricted to the last one thousand feet of approach to an airport runway; it requires the same location of the DME with respect to the runway at every airport and is unusable with DME's at other locations; and it is susceptible of serious and dangerous errors if not put into operation by the pilot at the proper instant of time.

The present invetnion provides a simple light-weight and inexpensive device which is adapted to cooperate with so-called distance measuring equipment (usually designated DME) to provide an aircraft pilot with command altitude guidance information enabling him to effect accurately a desired change in altitude, ascending or descending, while within the operative range of a DME the location of whose ground components is known.

Conventional "distance measuring equipment" (DME) usually comprises, for example, a high frequency radio wave pulse transmitter on the aircraft, a ground receiver at or near the airport in fixed relation thereto, a pulse transmitter rendered operative by signals from the ground receiver poduced by pulses received from the aircraft transmitter, a receiver on the aircraft adapted to receive pulses from the ground transmitter, and means for producing at the aircraft an electrical signal or mechanical shaft displacement continuously representative of the elapsed time between the transmission of a signal from the aircraft and its reception at the aircraft after reception and retransmission from the ground station. As is well known, this elapsed time is proportional to the slant distance from the aircraft to the ground receiver-transmitter.

According to the invention, means is provided on the aircraft for converting the instantaneous electrical signal or mechanical displacement outputs of a DME to the corresponding instantaneous altitudes required to establish a given command slant flight path between two locations at different altitudes. In a typical case, the flight path may begin at takeoff on the ground and extend to a given altitude which may be cruising altitude. Alternatively, it may start at the altitude where the descent from cruising altitude begins and extend to a lower altitude which may be, for example, an outer fix near an airport where the aircraft is to land. The apparatus of the invention is of particular utility in providing the pilot with aircraft command altitude reference information on final approaches to airport runways so as to enable him to make smooth, safe and efficient descents. Only one properly located DME is needed at an airport to enable such altitude guidance to be provided in either direction to most, if not all, runways of the airport.

The distance-to-altitude converter of the invention may be any simple form of multiplier connected to receive the distance representing electrical or mechanical output of a DME and to provide an output of altitude in feet in accordance with the relation:

$$\text{Altitude} = \text{DME distance} \times \sin \alpha$$

where $\alpha$ is the angle between the horizontal and the desired slant line through the DME ground station. The converter also includes means to modify the command altitude output to compensate for the elevation of the airport and for the location of the DME ground station with respect to the airport runways. Accordingly, the equipment is capable of providing accurate command altitude guidance regardless of the airport altitude and, within certain limits, without regard to the location of the DME ground station.

In a more highly developed form, means is provided for comparing the command altitude output of the converter with the actual altitude of the aircraft as indicated by its altimeter, and for generating a deviation signal which may be exhibited on a suitable indicator. Alternatively, the deviation signal may be supplied to conventional flight director or automatic pilot equipment to control the altitude of the aircraft in accordance with the command altitude information furnished by the conveter.

The invention may be better understood from the following detailed description of several typical embodiments thereof, taken in conjunction with the accompanying drawings in which.

The invention will be first illustrated as applied to a system for providing pilot guidance in runway approaches and descents from high altitudes. Broadly, the system comprises an indicator which is positioned by distance information supplied by a DME but which is calibrated in terms of command altitude. For an aircraft such as the Boeing 707, for which the optimum glide slope angle is about 2.83°, the indicator is calibrated to read 300 feet of altitude per nautical mile of DME distance, the altitude decreasing with decreasing distance to zero at zero distance. Descent of the aircraft along the desired 2.83° glide slope path is achieved by maneuvering the aircraft so as to maintain its altitude in coincidence with the reading on the command altitude indicator.

In order to compensate for airport altitude and for DME ground stations located elsewhere than at the threshold of an airport runway, the system also includes means for introducing a precomputed zero distance altitude setting so the indicator will read the airport altitude at touchdown. Also, in order to enable operation of the system in relation to a DME ground station located so that it lies behind the aircraft as the latter makes its final approach to a runway, means is provided for inverting the relation between DME distance and command altitude so that the latter will decrease as the DME distance increases.

Figure 1:
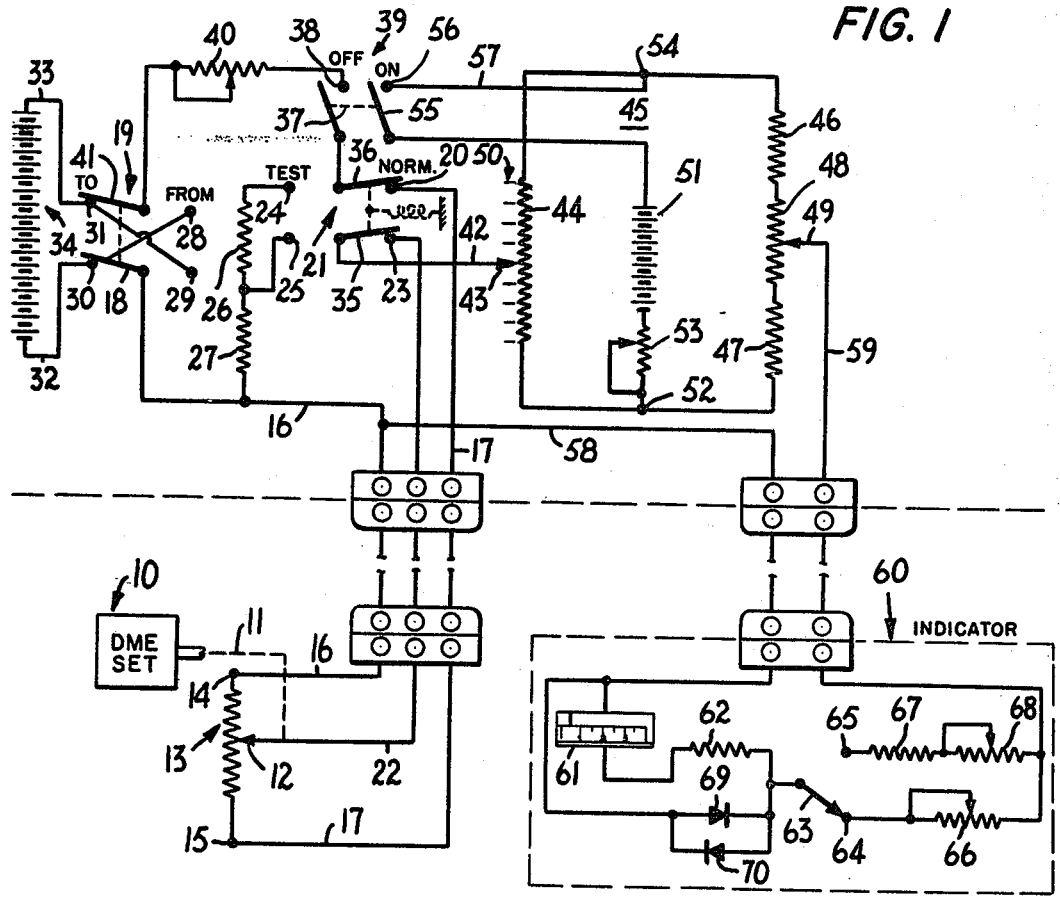
FIG. 1 is a schematic diagram of one form of command altitude indicator system constructed according to the invention.

Referring now to FIG. 1 of the drawings, an airborne DME set 10 on an aircraft provides a mechanical output at the shaft 11 which is proportional to distance from the aircraft to the DME ground station. The shaft 11 drives the movable contact 12 of a conventional potentiometer 13, the end terminals 14 and 15 of which are connected by conductors 16 and 17, respectively, to the movable contact 18 of a double pole double throw "TO-FROM" switch 19 and to the fixed contact 20 of a double pole double throw "TEST-NORMAL" switch 21. The potentiometer movable contact 12 is connected by the conductor 22 to the fixed contacts 23 of the switch 21. The switch 21 also has fixed contacts 24 and 25 connected, respectively, to the end terminals of a resistance 26 which is connected through a resistance 27 to the conductor 16.

The switch 19 has fixed contacts 28 and 29 connected to the fixed contacts 30 and 31, respectively, which are connected by conductors 32 and 33, respectively, to a source of voltage such as a battery 34. It is moved to the "TO" position when the aircraft is approaching a DME ground station and to the "FROM" position on leaving a DME ground station, and it reverses the polarity of the voltage applied to the potentiometer 12 as required to invert the relation between DME distance and command altitude in going from one condition of operation to the other.

The switch 21 has ganged movable contacts 35 and 36 which are adapted to be moved into engagement with the fixed contacts 25 and 24 in the "TEST" position and into engagement with the fixed contacts 23 and 20 in the "NORMAL" position, as described in greater detail below. The movable contact 36 is connected through a movable contact 37 engageable with a fixed contact 38 of an "ON-OFF" switch 39 and through an adjustable resistance 40 to the movable contact 41 of the "TO-FROM" switch 19.

The movable contact 35 of the "TEST-NORMAL" switch 21 is connected by a conductor 42 to the movable contact 43 of a potentiometer 44 which forms one arm of a conventional bridge 45, the parallel arm of which includes the fixed resistors 46 and 47 and a resistor 48 having an adjustable contact 49. The potentiometer movable contact 43 is adapted to be adjusted in relation to a fixed scale 50 which is calibrated in feet of altitude and covers a wide enough range, say from minus 7,000 feet to plus 40,000 feet to accommodate all operating conditions likely to be encountered in normal operation.

The bridge 45 is adapted to be energized by a suitable source such as a battery 51 which is connected to the bridge terminal 52 through an adjustable resistor 53 and to the bridge terminal 54 through the movable contact 55 and fixed contact 56 of the "OFF-ON" switch 39 and the conductor 57. The bridge 45 is adapted to be adjusted as described in greater detail below to add to or subtract from the command altitude output from the potentiometer 13 in the DME set 10, a correction which takes into account the altitude of an airport and the location of the DME ground station.

The voltage representing the corrected command altitude is fed through the conductors 58 and 59 to an indicator 60 which includes a conventional microammeter 61 connected in series with a voltage dropping resistor 62 and the switch contact arm 63 which is movable selectively into engagement with the fixed contacts 64 and 65. The contact 64 is connected to the conductor 59 through an adjustable resistance 66 which limits the full-scale reading of the meter 61 to a maximum command altitude of say, 4,000 feet. The contact 65 is connected to the conductor 59 through a fixed resistor 67 and an adjustable resistor 68 which increase the range of the meter 61 to a command altitude of, say, 40,000 feet.

The meter 61 and resistor 62 are shunted by a pair of parallel connected, back-to-back diodes 69 and 70 which are adapted to provide protection for the meter movement when full-scale voltage is exceeded.

The system shown in FIG. 1 is put into operation by closing the "OFF-ON" switch 39 to apply power from the sources 34 and 51 to the potentiometer 13 and to the bridge 45, respectively. Initially, the resistor 40 is adjusted to give the desired voltage per unit of command altitude at the output of the potentiometer 13; the resistor 53 is adjusted to give the same voltage per unit of command altitude at the output of the bridge 45; the movable contact 49 is adjusted so that the output of the bridge 45 is zero when the movable contact 43 registers with zero on the scale 50; and the resistors 66 and 68 are adjusted to calibrate the meter 61 to read command altitudes correctly in response to the voltage input thereto.

The system may then be tested by throwing the switch 21 to the "TEST" position. This supplies a given voltage representative of a fixed command altitude, say, 3,000 feet, to the indicator. A reading of 3,000 feet on the meter 61 with the bridge 45 adjusted for zero bias and the switch contacts 63 and 64 engaged confirms that the equipment is properly adjusted. The switch 21 is preferably spring-biased so that it returns automatically to the "NORMAL" position when released.

Figure 2:
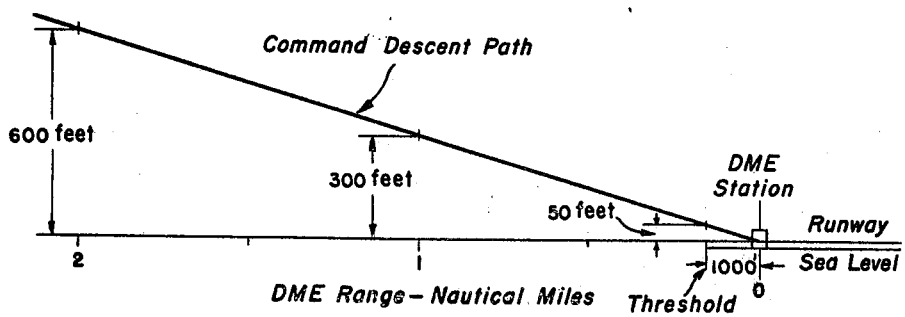
FIGS. 2, 3, 4 and 5 depict representative command descent paths that can be attained with the apparatus shown in FIG. 1.

In operation, assume that the system shown in FIG. 1 is mounted on an aircraft making an approach to an airport at sea level having a DME ground station located at the touchdown point on the runway, as shown in FIG. 2. For these conditions, no zero distance setting is required and the movable contact 43 of the bridge potentiometer is maintained at zero on the scale 50. Since the aircraft is approaching the DME ground station, the switch 19 is thrown to the "TO" position and the indicator switch movable contact 63 is moved to the 4,000 foot range position. The meter 61 will then continuously read the correct command altitudes for a glide slope angle of 2.83° down to zero distance. Hence, if the aircraft is maneuvered so as to maintain its altitude in coincidence with the reading of the command altitude indicator, it will descend along the 2.83° glide slope shown.

Figure 3:
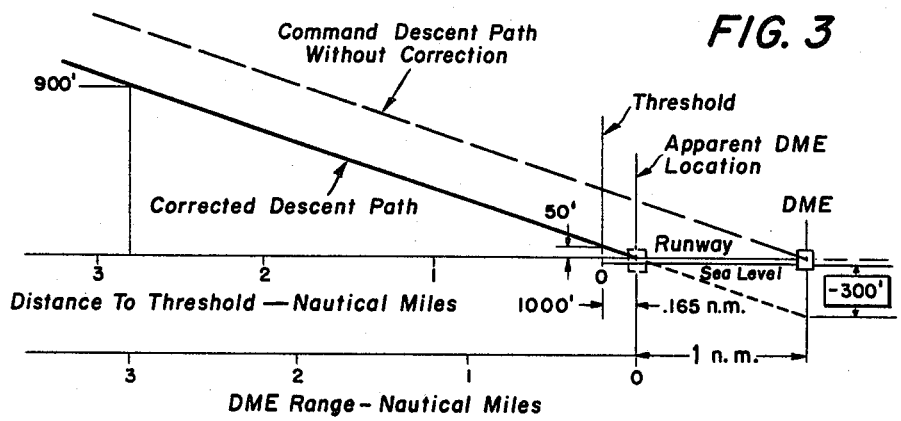

In the situation illustrated in FIG. 3, the DME ground station is located 1.0 mile beyond the runway touchdown point. In this case, the pilot needs only to adjust the movable bridge contact 43 until it registers with the —300 feet marking on the scale 50 to bring the corrected descent path defined by the command altitude readings on the meter 61 to zero at the desired touchdown point.

Figure 4:
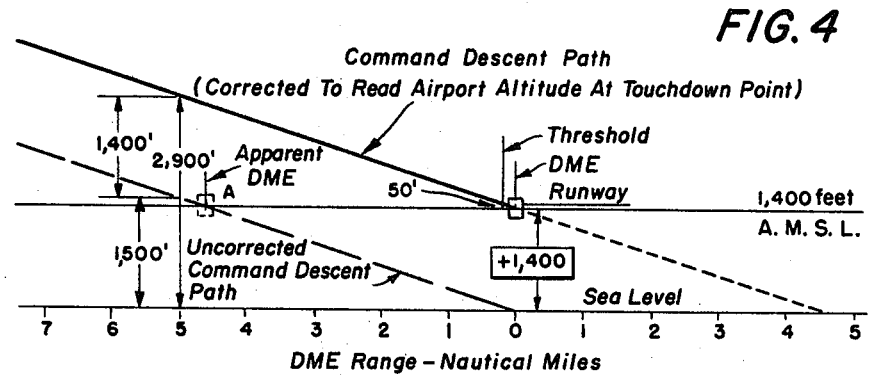

The zero distance setting potentiometer may also be used to overcome the problem of airport altitude. Thus, in FIG. 4, the DME ground station is installed at a touchdown point on a runway which is at an altitude of 1400 feet above sea level. The airport altitude makes it appear as if the DME ground station were located at point A 4⅔ miles before the touchdown point. If not compensated, the descent path would be 1400 feet below the desired path. However, by adjusting the movable contact 43 of the zero distance setting potentiometer to the plus 1400 feet position on the scale 50, the correct descent path to the airport is defined by the readings of the meter.

In practice, of course, each pilot will be provided with precomputed zero distance altitude reference numbers, preferably displayed on the airport runway approach chart, to enable him to establish accurately the proper guide slope for each specific runway (or outer fix) to which he may need to descend. Also there may be provided with each altitude reference number a correct precomputed command altitude corresponding to a given DME distance, to enable the pilot to make an altitude accuracy check by comparing the command altitude reading obtained at the given distance as indicated by the DME with the precomputed command altitude for that distance.

From the foregoing examples, it will be obvious that the system shown in FIG. 1 can be effectively employed to provide pilot guidance during a descent from a cruise altitude of say, 33,000 feet to a lower initial approach altitude at a given distance from a DME ground station. In such case, the indicator movable switch contact 63 (FIG. 1) is moved to the 40,000 foot maximum range position. By introducing the proper zero distance correction as described above to compensate for airport altitude and DME ground station location, the correct glide slope path can be achieved by controlling the aircraft altitude in accordance with the command altitude readings on the meter 61.

The typical examples described above all involve descents in the "TO" mode of operation in which an aircraft approaches a DME ground station and the command altitude values registered by the meter 61 decrease as the distance decreases. In some cases, however, the DME ground station may be remotely located so that the desired descent path decreases when going way from the station.

Figure 5:
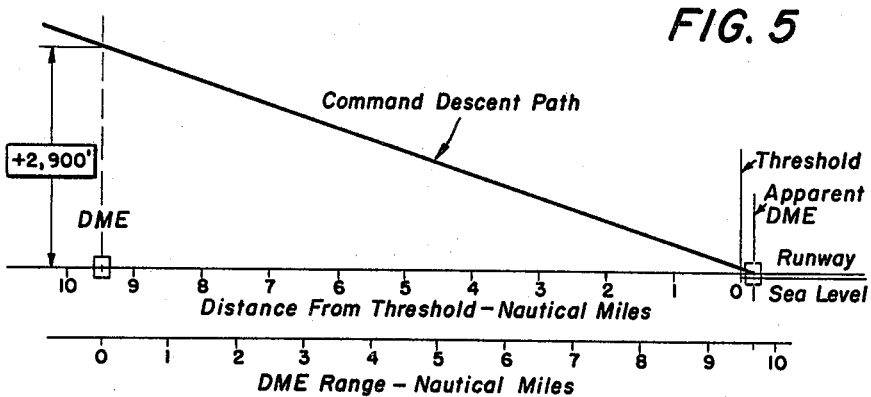

For example, in FIG. 5, the DME ground station is located on the approach path 9.5 miles from the runway threshold. For an aircraft to be on the correct descent path to the airport runway, it should be flying at an altitude of 2900 feet as it passes over the DME ground station. So that the command altitude indicated by the meter 61 will have this value at zero distance from the DME, the zero distance set movable contact 43 should be positioned to register with the plus 2900 feet mark on the scale 50. If, then, the switch 19 is thrown to the "FROM" position, the connections between the source 34 and the DME potentiometer 13 will be reversed. This causes the increasing command altitude representing voltage at the potentiometer movable contact to become negative and to be subtracted from the positive voltage provided by the zero distance set, the net voltage becoming zero at the touchdown point.

Figure 6:
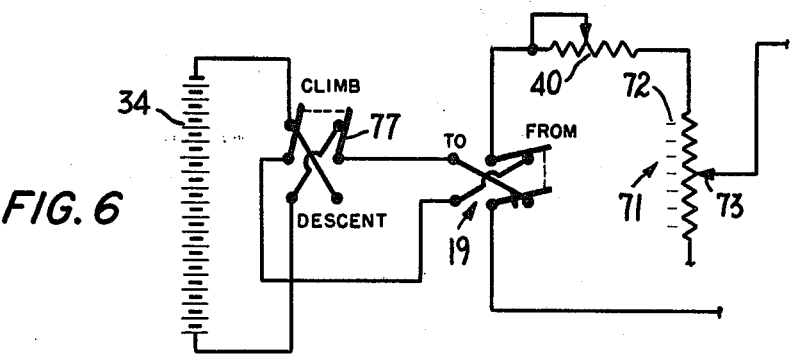
FIG. 6 illustrates a modification of the system shown in FIG. 1 to enable it to be used for climbout guidance.

By a slight modification, the command altitude indicator apparatus shown in FIG. 1 may be provided with climbout altitude guidance capability. Since the optimum climb angle during a given climbout depends on gross weight, temperature, noise reduction and other factors, the system should be operable selectively at a number of different climb angles. This may be accomplished by inserting a rheostat 71 between the series resistor 40 and the "OFF-ON" switch 39 as shown in FIG. 6. The rheostat 71 should be provided with a calibrated scale 72 enabling its slider 73 to be set to different climb angles within a desired range, say, from 1° to 10°.

In addition, a "CLIMB-DESCENT" switch 77 should be interposed between the source 34 and the "TO-FROM" switch 19 as shown. This is a simple double pole, double throw reversing switch which can be operated to take into account the fact that in the "CLIMB" mode, the movement of an aircraft in relation to the ground DME station, whether located remotely or at an airport, is the reverse of what it is in the "DESCENT" mode.

Figure 7:
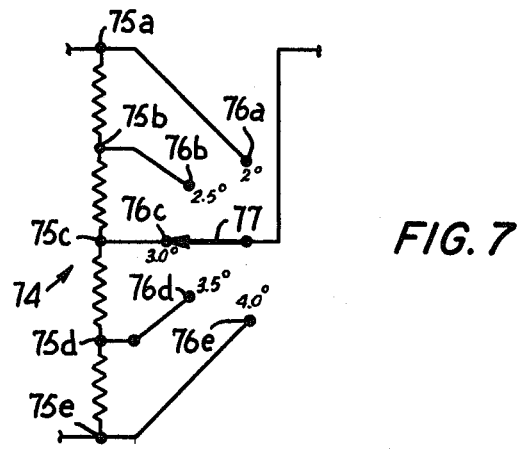
FIG. 7 is a schematic diagram of a portion of FIG. 6 modified to provide discrete steps of climb angle rather than continuously variable angles.

If discrete steps of climb angle are desired, this may be achieved by using in place of the adjustable resistor 71 a fixed resistor 74 having a plurality of taps 75a, 75b, 75c, 75d and 75e connected to the respective fixed contacts 76a, 76b, 76c, 76d and 76e which are adapted to be engaged selectively by a movable switch arm 77, as shown in FIG. 7.

Figure 8:
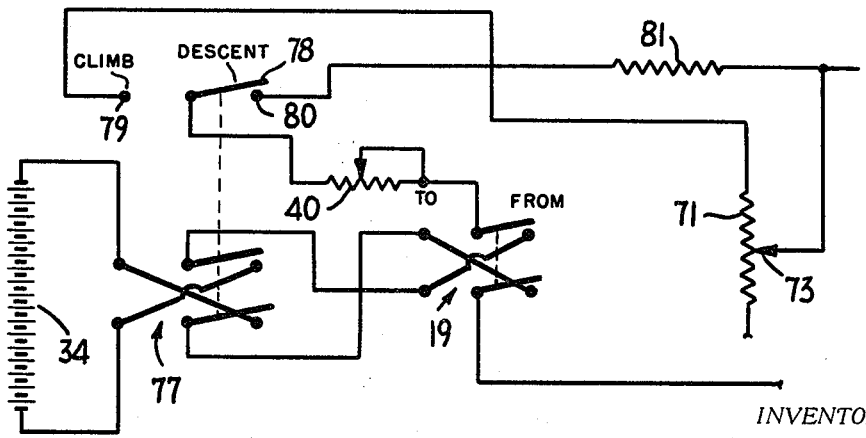
FIG. 8 illustrates a further modification of the circuit shown in FIG. 6 to provide for fixed descent angle and variable climb angle operation.

FIG. 8 illustrates a modification of the system shown in FIG. 6 which includes provision for both fixed descent angle and variable climb angle. This is accomplished by providing the "CLIMB-DESCENT" switch with an additional movable contact arm 78 interposed between the adjustable resistors 40 and 71 and selectively engageable with fixed contacts 79 and 80. The adjustable resistor 71 is connected to the fixed contact 79 and a fixed resistor 81 of the proper value to establish the correct DME potentiometer range voltage is connected between the fixed contact 80 and the movable contact 73 on the climb angle rheostat 71.

Figure 9:
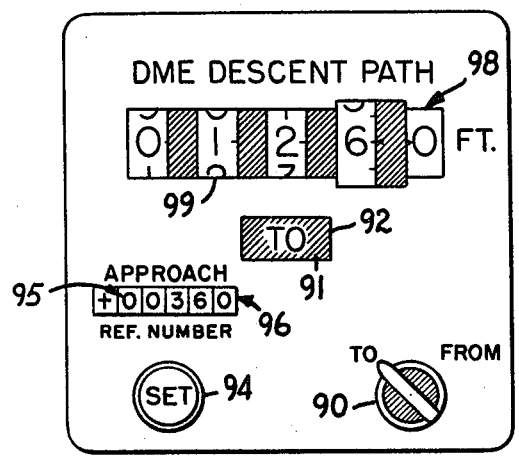
FIGS. 9 and 10 are schematic diagrams illustrating another modification of the invention which provides command altitude in the form of a digital output.
Figure 10:
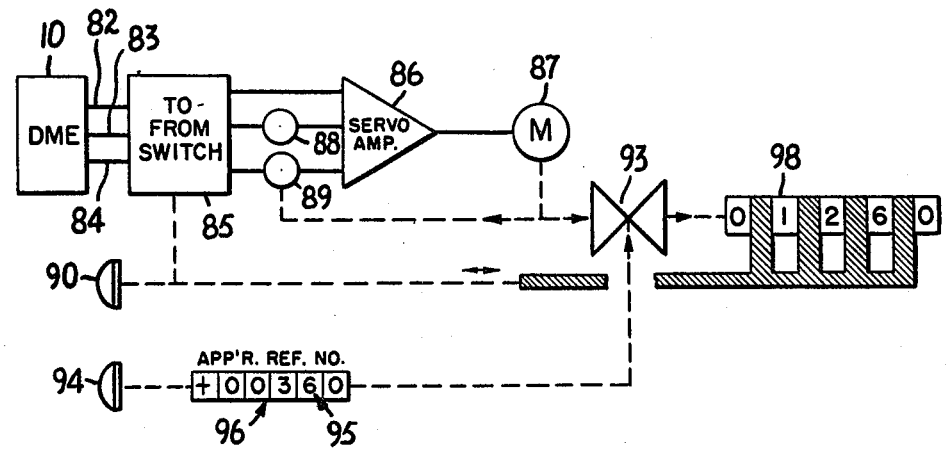

FIGS. 9 and 10 illustrate schematically descent and approach guidance digital command altitude indicating means embodying the invention. In this embodiment, the DME 10 on the aircraft provides electrical outputs at the conductors 82, 83 and 84, respectively, representing the hundreds, tens and digit values of the distance measured by the DME. These are fed through conventioned reversing switch means 85 to a conventional servoamplifier 86 which is adapted to drive a servomotor 87. The mechanical output of the servomotor 87 is connected to a pair of control transformers 88 and 89 in the conductors 83 and 84, respectively, which function in the conventional manner to drive the servomotor 87 to give it a shaft displacement proportional to the range input from the DME 10.

The switch 85 is operable manually by a knob 90 to reverse the connections between the servoamplifier 86 and the conductors 82, 83 and 84 to reverse the direction of rotation of the servomotor 87. Movement of the knob 90 from the "TO" to the "FROM" position also moves a flag 91 through conventional linkage means (not shown) to exhibit the appropriate word "TO" or "FROM" in a window 92.

The mechanical output of the servomotor 87 is fed as one input to a conventional mechanical differential 93, which receives a second mechanical output from a manually adjustable zero distance set knob 94, through a conventional mechanical counter 95 which exhibits through a window 96 the number set in by operation of the knob 94. The output of the differential 93 drives a second conventional mechanical counter 98 capable of operating both in the forward and the backward directions. The reading of the counter 98 is viewable through a window 99.

For a fixed descent glide slope angle of, say 2.83°, the system of FIG. 10 is so constructed that for every mile registered by the DME 10, the counter 98 registers 300 feet of altitude. By manual operation of the knob 94, the pilot can set into the counter 95 the proper zero distance altitude (approach reference number) to compensate for the location of the DME ground station and the airport altitude, as described above. Also, the "TO-FROM" switch 85 can be operated by the knob 90 as required to provide operation either in the "TO" or "FROM" mode with respect to the DME ground station. Operation of this digital indicator embodiment is basically the same as operation of the several analog indicators described above and it will not be necessary to describe it in detail.

If desired, the aircraft's altitude can be automatically compared to the indicated command altitude to provide a deviation signal which can be displayed on a conventional ILS (instrument landing system) indicator in the same manner as an ILS glide slope. Alternatively, the deviation signal can be fed to a flight director to compute pitch commands for the aircraft. A system of this general character is illustrated schematically in FIGS. 11 and 12. It includes all of the components present in the system shown in FIG. 10 and corresponding parts are designated by like reference characters.

Figure 11:
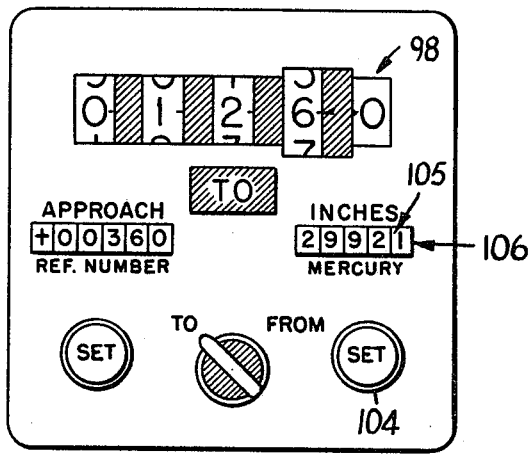
FIGS. 11 and 12 illustrate schematically a further modification of the invention in which the output signal is representative of the deviation between the command altitude and the actual altitude of the aircraft.
Figure 12:
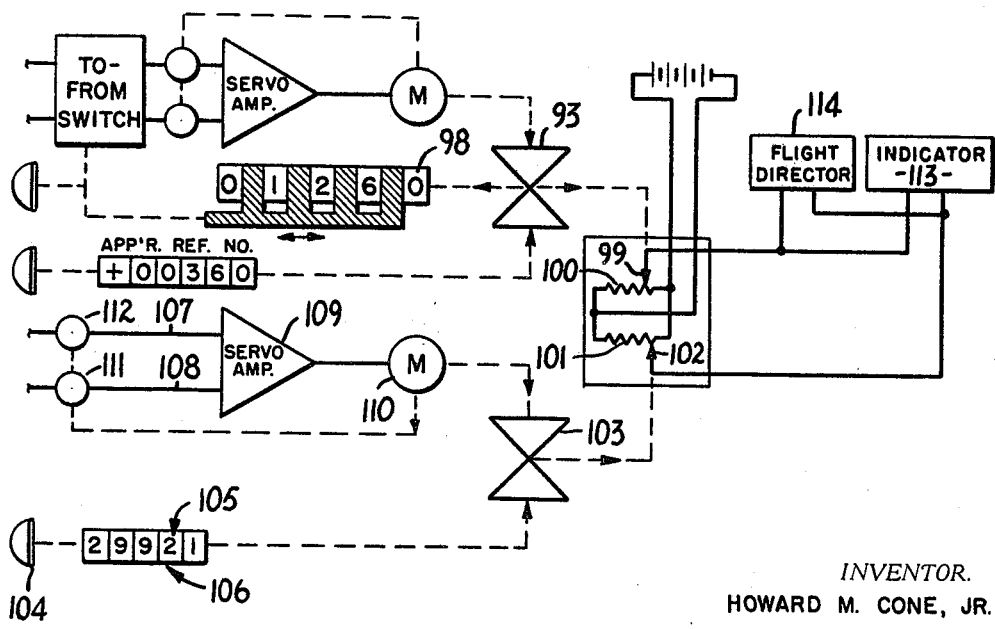

Referring now to FIGS. 11 and 12, the command altitude output of the differential 93 also drives the movable contact 99 of a potentiometer 100 energized by a reference voltage. The potentiometer 100 is connected in series opposition with a second potentiometer 101 also energized by the reference voltage and having a movable contact 102 driven by the output of a conventional mechanical differential 103. The differential 103 receives as one input the airport barometric pressure setting in inches of mercury which is set in by manual operation of a knob 104, the reading also being registered by a conventional counter 105 viewable through a window 106.

A second input to the differential 103 is a mechanical shaft rotation proportional to the aircraft's altitude referenced to 29.92 inches of mercury. To this end, an electrical output representing the altitude is received from the aircraft's air data system over the conductors 107 and 108 and fed to a servoamplifier 109. The servoamplifier 109 drives a servomotor 110 which supplies a mechanical input to the differential 103 and also drives control transformers 111 and 112 in the lines 107 and 108 in the conventional manner to maintain proportionality between the servomotor output and the altitude representing electrical input.

In operation, it will be understood that the electrical output between the movable contacts 99 and 102 of the potentiometers 100 and 101 is proportional to the deviation between the command altitude registered by the counter 98 and the aircraft's altitude. This can be supplied to any conventional deviation indicator 113 or to a flight director 114 to compute pitch commands for the aircraft, as desired.

Desirably, the DME ground station should be essentially aligned with the airport runway for making accurate descents and approaches to airports. However, the DME ground station may be offset from the runway provided that the angle between the runway and a line from the DME site to a reference point one mile from the approach end of the runway does not exceed about fifteen degrees. Also, the equipment should preferably be used in conjunction with a suitable bearing reference such as the equipment designated VOR (VHF omnirange) so that the aircraft can be headed in the direction of the DME ground station.

As a safety measure the command altitude indicator of the invention should preferably be provided with suitable means to warn the pilot when the DME system is not operating. This may be, for example, a fail-safe flag arranged to cover the indicator reading when the DME system is inoperative and to expose the indicator reading to view only when the instrument is receiving the proper DME signal input.

The invention thus provides novel and highly effective means for furnishing to an aircraft pilot accurate command altitude information enabling him with a minimum of instruction and training to make correct descents and approaches and to execute climbout operations reliably at optimum climb angles. It should, therefore, reduce the possible hazard of hitting obstructions on the descent or approach, and minimize the tendency to overshoot or undershoot the runway in landing, thereby insuring safer operation.

It provides for more economical operation in that; one, when used in conjunction with a VOR (VHF omnirange) for runway alignment, the instrument will allow the approach weather minimums to be reduced materially for most, if not all runways of an airport; two, it will reduce the time required for descent and approach; and three, air traffic control distance separations between aircraft may be reduced safely. Further, it will aid airport noise abatement procedures because a pilot can maintain the proper guide slope and thus avoid lower and noisier approaches. In addition, it should contribute significantly to increased passenger comfort and confidence by reducing the need for radical maneuver and throttle on-off operation which sometimes produces cabin pressure surges and noises that are unnerving to some passengers.

I claim:

1. In command altitude guidance apparatus for aircraft, the combination of
    converter means adapted to receive an input representing distance from an aircraft to a remote station at a reference location and to provide a command altitude output that is a function of said input,
    means settable to a predetermined reference value,
    means responsive to said converter means and to said settable means for combining said command altitude output and said reference value, and
    means responsive to said combined command altitude output and reference value for providing command altitude guidance for the aircraft.

2. Aircraft command altitude guidance apparatus as defined in claim 1 in which actuatable means is provided for modifying the operation of the converter means to modify said output function.

3. Aircraft command altitude guidance apparatus as defined in claim 1 in which the settable means is settable to both positive and negative values and the combining means is adapted to combine the command altitude output and the reference value algebraically.

4. Aircraft command altitude guidance apparatus as defined in claim 1 in which
    the converter means comprises a first source of electrical energy adjustable in response to distance from an aircraft to a remote station at a reference location to provide a first electric signal output that is a function of said distance and is representative of command altitude,
    the settable means comprises a second source of electrical energy adjustable to provide a second reference electric signal output,
    the combining means comprises electric circuit means including said first and second sources of electrical energy for combining said first and second electric signals algebraically, and
    the means providing command altitude guidance for the aircraft comprises electrical indicating means connected in said electric circuit means and responsive to said combined first and second electric signals.

5. Aircraft command altitude guidance apparatus as defined in claim 4 in which
    means is provided for controlling said first source of electrical energy to change the function represented by said first electric signal output, and
    the second source of electrical energy is adjustable selectively to produce second electrical signals having positive or negative values representative of reference command altitudes.

6. Aircraft command altitude guidance apparatus as defined in claim 4 in which
    the first source of electrical energy comprises an electrically energized potentiometer having a movable contact adjustable in response to distance from an aircraft to a remote station at a reference location to provide a first electric signal output that is a function of said distance and is representative of command altitude, the second source of electrical energy comprises an electrically energized bridge adjustable selectively over a range to provide a second reference electrical signal of positive or negative polarity representative of reference command altitude, and means is provided to reverse the polarity of energization of said potentiometer to facilitate operation in aircraft moving either towards or away from said ground station.

7. Aircraft command altitude guidance apparatus as defined in claim 6 in which means is provided for enabling energization of said potentiometer selectively at different intensities corresponding to different functions to be represented by said first electric signal, and second means is provided for reversing the polarity of energization of said potentiometer to afford command altitude guidance in either ascent or descent of the aircraft.

8. Aircraft command altitude guidance apparatus as defined in claim 7 in which means is provided which is operable with said second polarity reversing means for restricting the intensity of energization of said potentiometer to a fixed value during descent of the aircraft.

9. Aircraft command altitude guidance apparatus as defined in claim 1 in which the converter means comprises servomotor means adapted to receive an input representing distance from the aircraft to a ground station and to provide a mechanical displacement that is a function of said input and is representative of command altitude, the settable means comprises a member adapted to be given a mechanical displacement representative of a reference value, the combining means comprises differential means responsive to the mechanical displacements of said respective servomotor means and settable means and adapted to provide a mechanical output representative of a combination of said mechanical displacements, and the means affording command altitude guidance for the aircraft comprises means responsive to the mechanical output of said differential means.

10. Aircraft command altitude guidance apparatus as defined in claim 9 together with means providing a mechanical output representing aircraft altitude, means responsive to said mechanical output representing aircraft altitude and to the output of said differential means for generating a signal representative of the deviation therebetween, and means responsive to said deviation responsive signal.

11. Aircraft command altitude guidance apparatus as defined in claim 9 in which the means responsive to said deviation signal comprises flight director means.

References Cited

UNITED STATES PATENTS

| | | | |
|---|---|---|---|
| 2,732,538 | 1/1956 | Decelles | 340—26 |
| 3,230,527 | 1/1966 | Wehde et al. | 343—9 |
| 3,398,267 | 8/1968 | Hattendorf | 343—108 XR |
| 3,406,280 | 10/1968 | Vago | 235—150.27 |

ALVIN H. WARING, Primary Examiner

U.S. Cl. X.R.

235—150.22, 150.27; 340—26; 343—108